C. C. COULTER.
SHAFT AND TONGUE COUPLING.
APPLICATION FILED SEPT. 22, 1910.
1,022,304.
Patented Apr. 2, 1912.
2 SHEETS—SHEET 2.
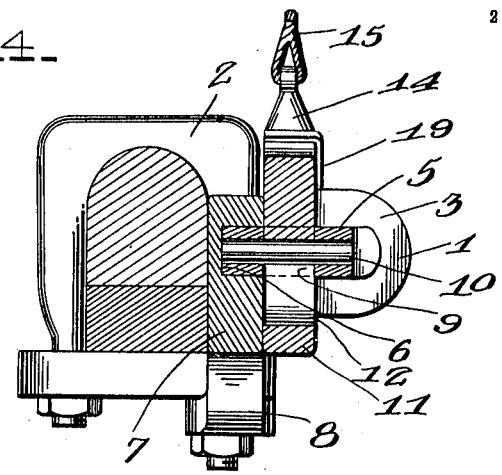
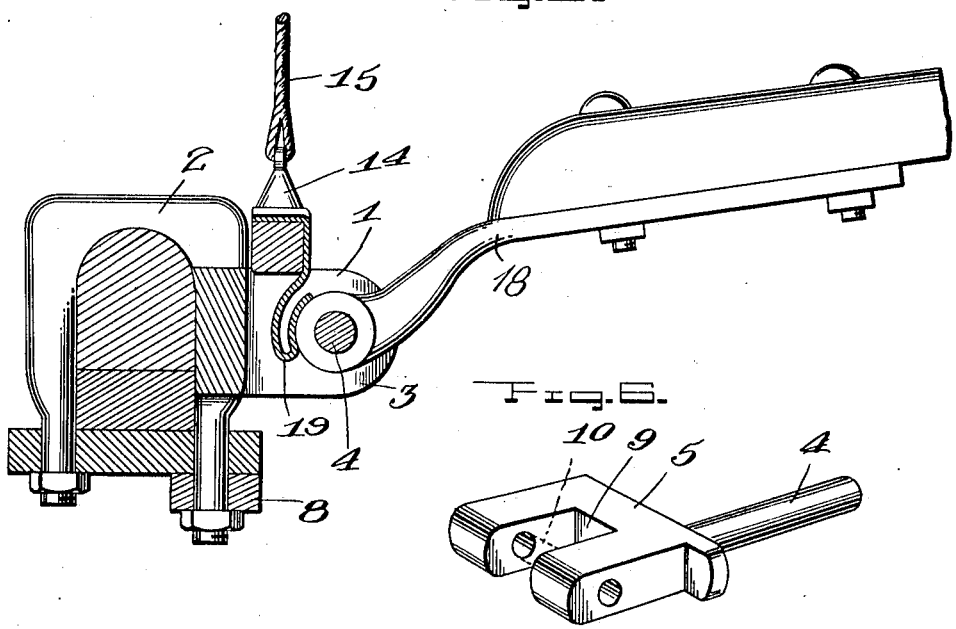
Witnesses
M. H. Rodwell
O. B. Hopkins
Inventor
C. C. Coulter
by H. B. Willson & Co.
Attorneys

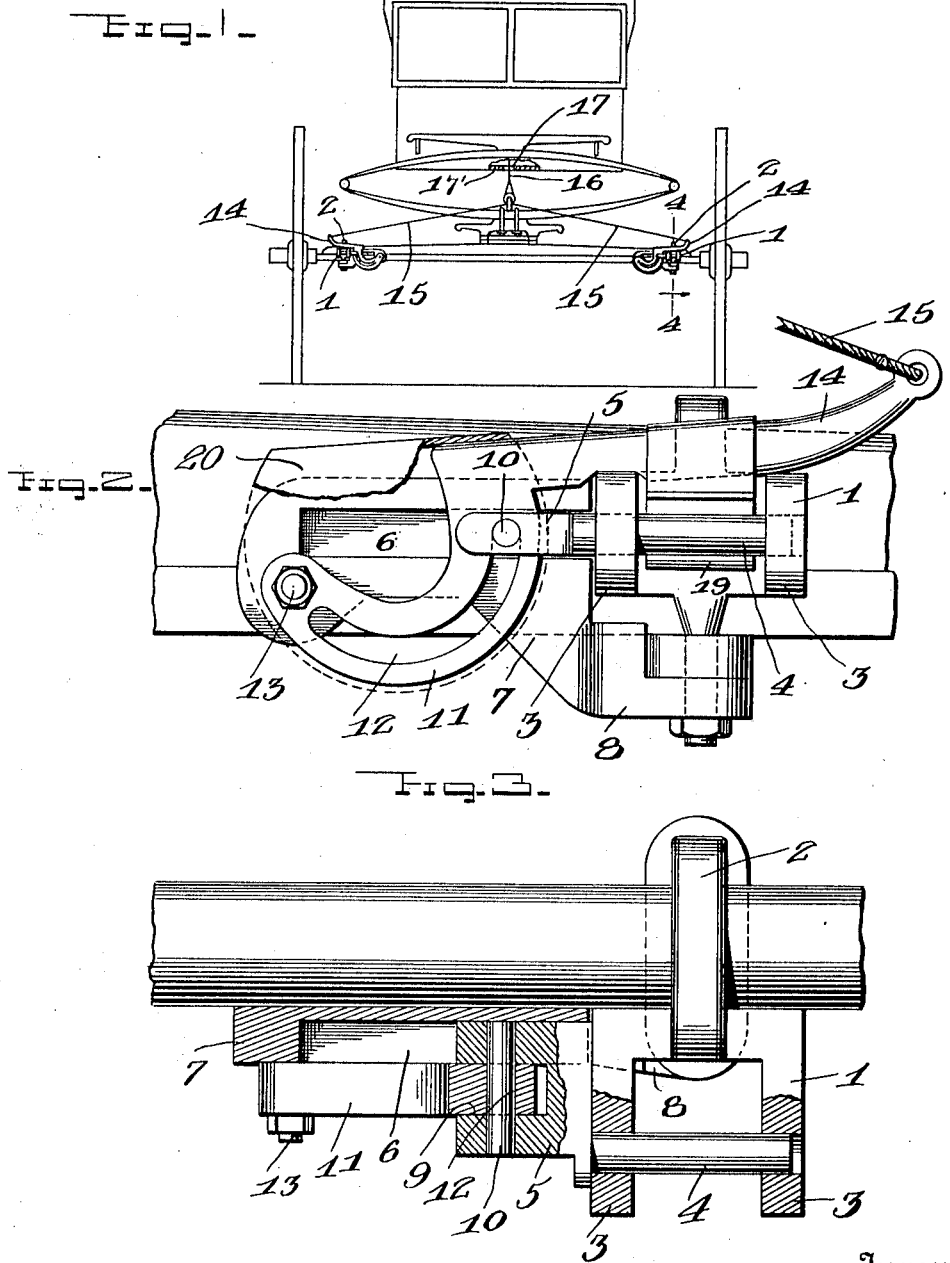

UNITED STATES PATENT OFFICE.

CURTIS C. COULTER, OF ROCK ISLAND, ILLINOIS.

SHAFT AND TONGUE COUPLING.

1,022,304. Specification of Letters Patent. Patented Apr. 2, 1912.

Application filed September 22, 1910. Serial No. 583,250.

*To all whom it may concern:*

Be it known that I, CURTIS C. COULTER, a citizen of the United States, residing at Rock Island, in the county of Rock Island and State of Illinois, have invented certain new and useful Improvements in Shaft and Tongue Couplings; and I do declare the following to be a full, clear, and exact description of the invention, such as will enable others skilled in the art to which it appertains to make and use the same.

This invention relates to improvements in shaft and tongue couplings for vehicles.

One object of the invention is to provide a coupling of this character having means whereby the same may be released by the occupant of the vehicle thus disconnecting the shafts or tongue therefrom.

A further object is to provide a device of this character which will be simple, strong and durable in construction, efficient and reliable in operation and which is provided with means to prevent the rattling of the shafts.

With these and other objects in view the invention consists of certain novel features of construction, combination and arrangement of parts as will be more fully described and particularly pointed out in the appended claim.

In the accompanying drawings, Figure 1 is a front view, partly in section, of a portion of a vehicle showing the invention applied thereto; Fig. 2 is an enlarged front view of one of the coupling members showing the casing in section; Fig. 3 is a horizontal sectional view of the same; Fig. 4 is a vertical cross section on the line 4—4 of Fig. 1 looking in the direction of the clip; Fig. 5 is a similar view through the clip, coupling-pin and end of the shaft showing the anti-rattling attachment of the coupling. Fig. 6 is a detail perspective view of the coupling pin.

Referring more particularly to the drawings, 1 denotes the coupling consisting of right and left hand members adapted to be connected with the axle of the vehicle by clips 2 of the usual or any suitable construction and which are here shown as having a pair of apertured lugs 3 with which is engaged the coupling bolt 4. The bolt 4 is formed on the end of an operating head 5 which has a sliding engagement with a guide groove 6 formed in one side of a pin supporting plate 7, said groove also limiting the movement of the head and bolt. The plate 7 is arranged in front of and in engagement with the axle and is provided with a downwardly projecting fastening lug 8 which is provided with an aperture whereby the same is engaged with one of the bolts of the clip and is secured in place by the nut on said bolt.

In the head 5 of the pin 4 is formed a notch 9 in which is arranged a cross pin 10. Slidably engaged with the notch 9 is a curved bolt operating bar 11 in which is formed a segmental slot 12 through which the pin 10 passes. The bar 11 is pivotally mounted on a stud bolt 13 projecting from the plate 7 and on the opposite end of the bar 11 is arranged an operating arm 14 to which is connected an operating cord 15 which extends along the axle to the center of the vehicle where the two cords from the couplings at the opposite ends of the axle, meet and are joined to a single operating cord 16 which passes up through a suitable opening 17 formed in the bottom 17' of the vehicle. The cord 16 after passing through the bottom of the vehicle extends to within convenient reach of the driver or occupant whereby the cord may be readily grasped and pulled which operation will cause the arms 14 to swing the slotted bars 11 upwardly thus retracting the coupling bolts 4 thereby releasing the shafts or tongue as the case may be.

The shaft irons 18 are provided with the usual apertured heads which engage the space between the lugs 3 of the clips 2 and receive the coupling bolts 4 thus pivotally connecting the shafts to the axle in the ordinary manner. In order to prevent the shaft irons from rattling in the coupling I preferably provide anti-rattling devices in the form of substantially flat shaped springs 19 one end of each of which is connected to one of the arms 14 of the bolt operating bars 11. When the arms 14 are down in operative position the springs 19 are disposed between lugs 3 and engage the heads of the shaft irons 18 and the adjacent surface of the clips thus taking up all play and wear of the parts and preventing the rattling of the same. The springs 19 when so engaged also serve to hold the arms 14 and the coupling member controlled thereby in operative position and against casual releasing movement. Connected at its upper edge to the upper end of the bars 11 and arms 14 are guard plates 20 which cover and protect the operating parts of the coupling bolts.

A coupling constructed in accordance with my invention may be readily engaged with an ordinary coupling clip whereby an efficient means is provided for connecting the shafts or a tongue to the vehicle and in addition to connecting the shafts or tongue also provides means whereby the same may be quickly disconnected in case of a runaway or at any other time.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined in the appended claim.

I claim as my invention:

A shaft coupling comprising a clip having thereon apertured connecting lugs, a supporting plate adapted to be connected to said clip, a bolt operating bar pivotally connected to said plate and having a sliding engagement with said bolt, an operating arm formed on said bar, a guard plate secured to said bar and arm, an anti-rattling spring carried by said operating arm and adapted to be engaged with the coupled end of the shaft whereby the same is held against rattling and whereby the arm is held down in operative position, and means whereby the coupling is released by an occupant of the vehicle.

In testimony whereof I have hereunto set my hand in presence of two subscribing witnesses.

CURTIS C. COULTER.

Witnesses:
WM. C. SCHOEMAKER,
FRED WRIGHT.

---

Copies of this patent may be obtained for five cents each, by addressing the "Commissioner of Patents, Washington, D. C."